Oct. 29, 1929.   B. C. BOOTH   1,733,482
TOILET SEAT AND PROCESS OF MAKING THE SAME
Filed Sept. 19, 1927

Inventor:
BYRON C. BOOTH.
By James P. Shea
Attorney.

Patented Oct. 29, 1929

1,733,482

UNITED STATES PATENT OFFICE

BYRON C. BOOTH, OF MUSKEGON HEIGHTS, MICHIGAN, ASSIGNOR TO THE BRUNSWICK-BALKE-COLLENDER COMPANY, OF CHICAGO, ILLINOIS, A CORPORATION OF DELAWARE

TOILET SEAT AND PROCESS OF MAKING THE SAME

Application filed September 19, 1927. Serial No. 220,414.

My invention relates to an improvement in rubber-coated articles and process of making the same, and more specifically to closet seats.

Altho this type of seat has many advantages and has met popular favor, yet it has been impossible to incorporate pigment in the hard rubber coating in such wise as to impart a pleasing white, blue or other light color to the same and thus bring it in harmony with the walls and fixtures of bath rooms.

It is therefore an object of the invention to provide a rubber coating for toilet seats having a white or other desired light color.

It is a further object of the invention to provide a toilet seat with a hard rubber coating which will impart strength to the structure and a soft rubber coating for giving it an attractive appearance.

It is an object of the invention, therefore, to provide such seats with an additional layer of soft rubber which may be colored, and a seat will thus be produced which has not only sanitary qualities but which is also pleasing in appearance.

Other objects of the invention will appear as the description proceeds.

In the accompanying drawings forming a part of this specification:

Figure 1:
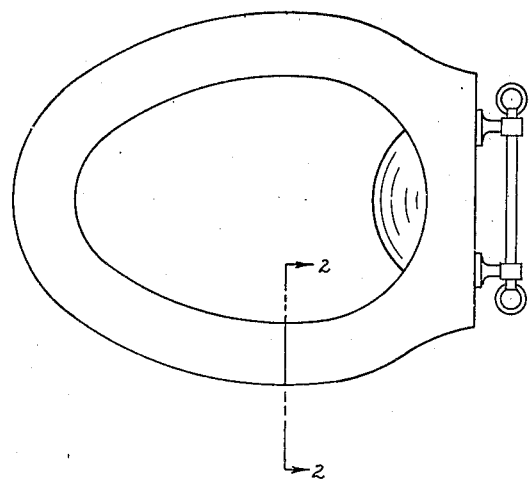
Fig. 1 is a plan view of a seat embodying the invention.
Figure 2:
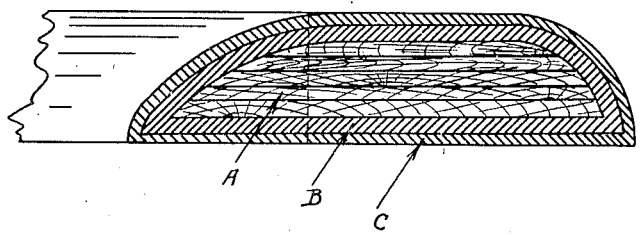
Fig. 2 is a cross sectional view taken on the line 2—2 of Fig. 1.

Referring to the drawings, the seat comprises a wooden core A, a layer on the core of hard rubber B, and an outer layer of soft rubber C. The wooden core A may be made up in the usual way from a blank consisting of a plurality of layers of wood.

After the core has been shaped and dried, it is covered with a heavy coating of rubber composition in a plastic state, and the wooden core covered with this plastic mass is then introduced into a suitable vulcanizing mold. The rubber forming the composition thus applied is made up with a comparatively large percentage of sulphur so that, after it has been vulcanized on the wooden core by subjecting the mold to a vulcanizing heat for a suitable length of time and then allowing it to cool, the seat will present a hard black surface.

The core A with the hard rubber coating B thus produced is then covered with a layer of soft rubber in a plastic state to which a pigment has been added. The composition of the soft rubber is low in sulphur content and is adapted to be colored by the addition of a suitable dye or pigment in order that it may harmonize with the walls and fixtures of the bath room. The pigment added may be of any suitable color, but as the bath room and fixtures are usually white, a white pigment such as white lead, lithopone, zinc oxide, or titanium oxide may be used, or, if preferred, a suitable dye may be added. Lithopone is generally preferred because of its cheapness.

The core with the two layers of rubber is then again introduced into a vulcanizing mold having a capacity of the exact duplicate of the finished seat. The mold is subjected to a vulcanizing heat for a suitable length of time after which the wooden core with its two layers of rubber is allowed to cool and the finished seat is then removed from the mold.

The seat now comprises a wooden core with a coating of hard rubber completely encasing and vulcanized to the core, and a layer of soft rubber completely encasing and vulcanized to the layer of hard rubber, with the layer of soft rubber suitably colored to harmonize with its surroundings.

While the description has been given in detail as to how the rubber coatings may be applied to a wooden core in order to form a finished seat, it will be understood that a seat cover may be formed in the same manner, a wooden frame being substituted for the core which is suitably shaped to form the cover. Similarly, other desired shapes and forms may be used as a core for the production of articles of various kinds.

While I have described the preferred form of my invention in detail, I do not wish to be limited to the exact embodiment shown, as many changes may be made within the scope of the invention as defined in the appended claims. For example, I may dispense with the first vulcanizing step and vulcanize the two rubber coatings simultaneously, although this is not my preferred process.

What I claim and desired to secure by Letters Patent is:

1. The process of making a toilet seat comprising the steps of forming a wooden core, coating said core with hard rubber, vulcanizing said coating, then applying a coating of soft rubber and vulcanizing the same.

2. A closet seat comprising a core, a vulcanized hard rubber coating on said core, and an outer coating of soft rubber having a light color vulcanized on said hard rubber coating.

3. A closet seat comprising a wooden core, a vulcanized hard rubber coating on said core, and an outer coating of white soft rubber, vulcanized on said hard rubber coating.

4. A closet seat comprising an outer coating of white, soft rubber vulcanized on a hard rubber body.

5. A closet seat comprising a rigid core and a coating of white soft rubber thereon having a smooth exposed surface.

BYRON C. BOOTH.